Patented Apr. 29, 1947

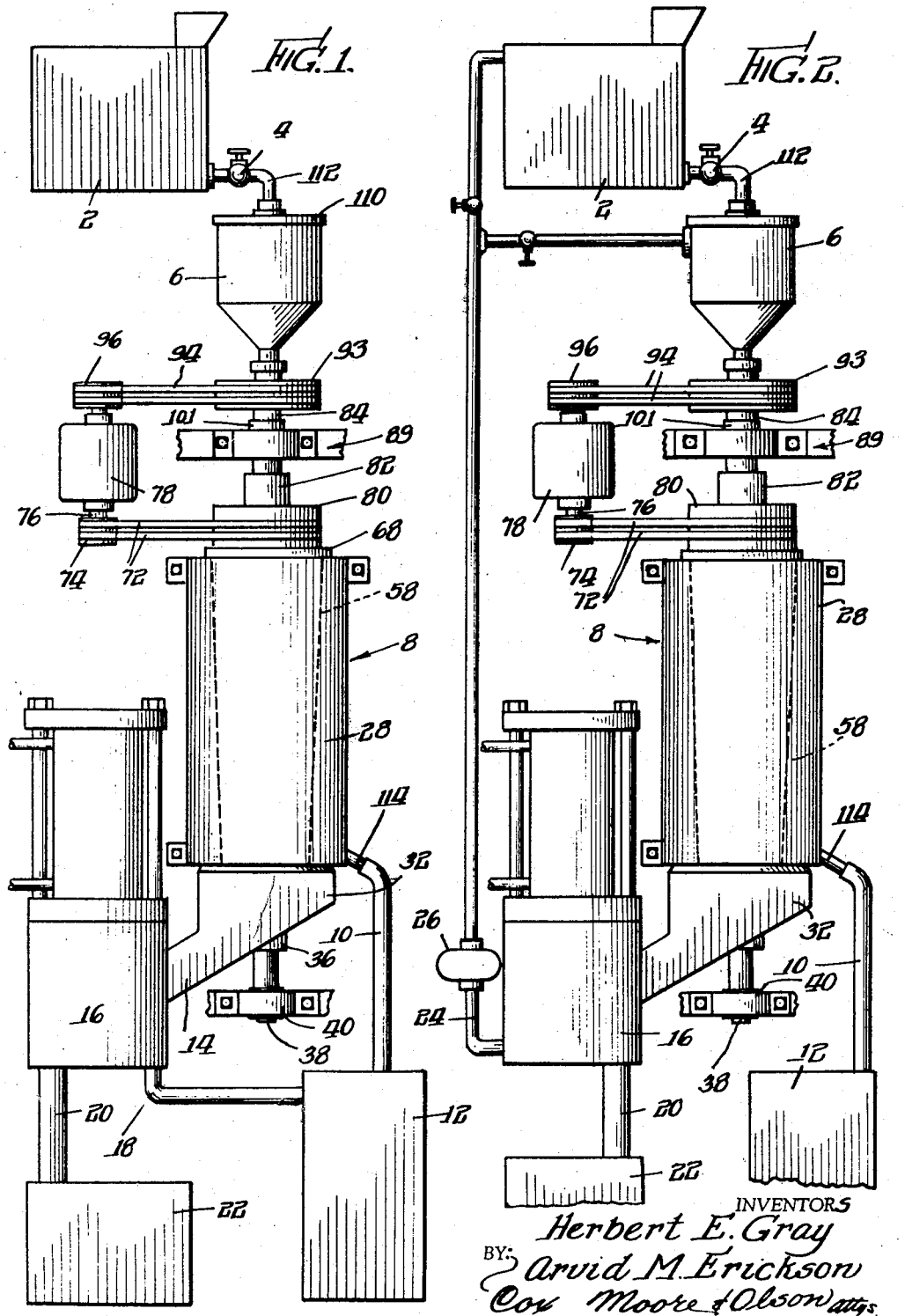

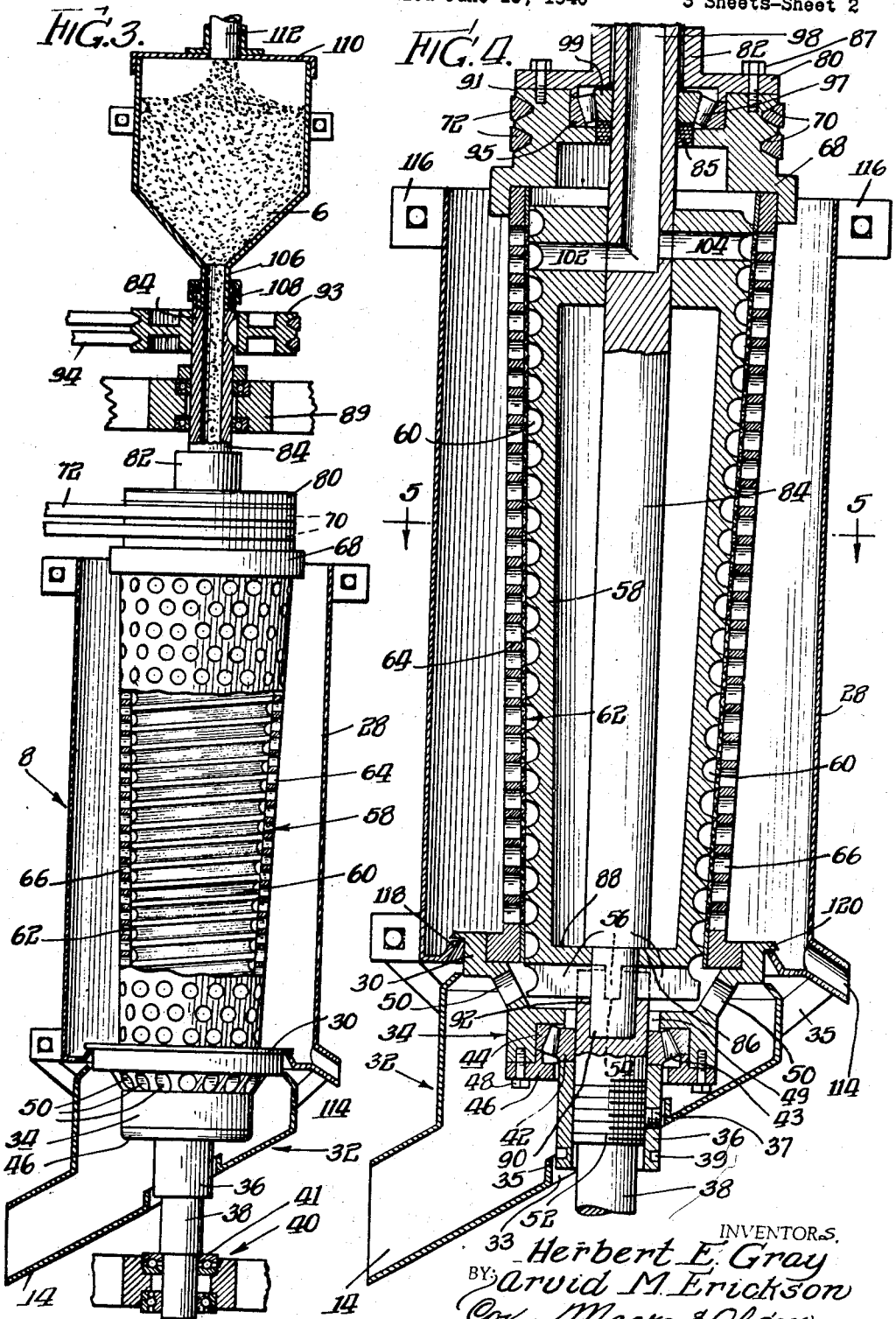

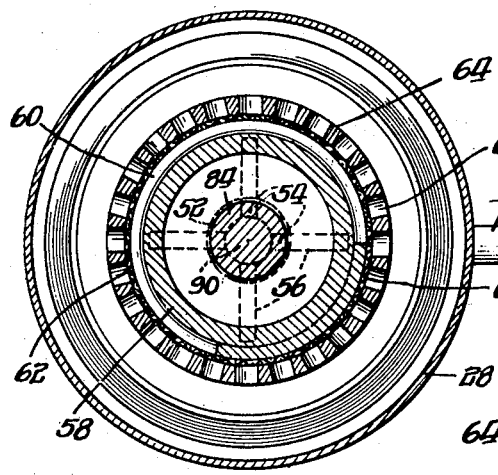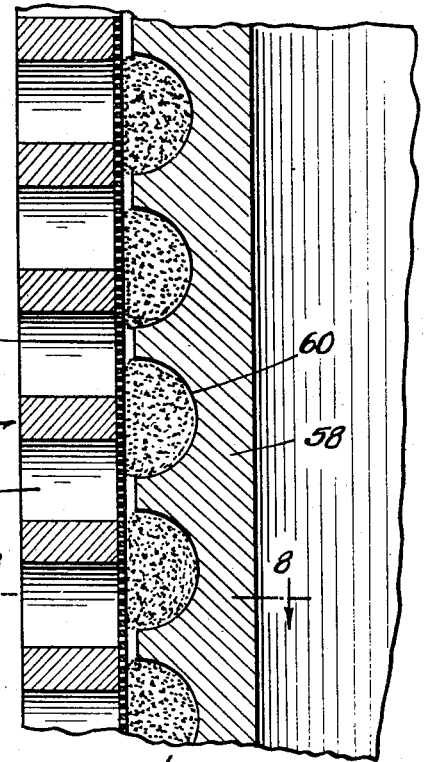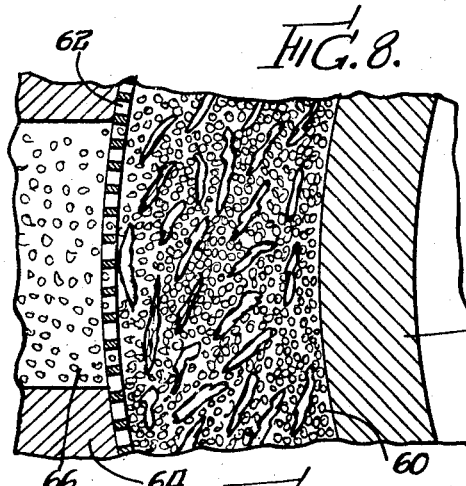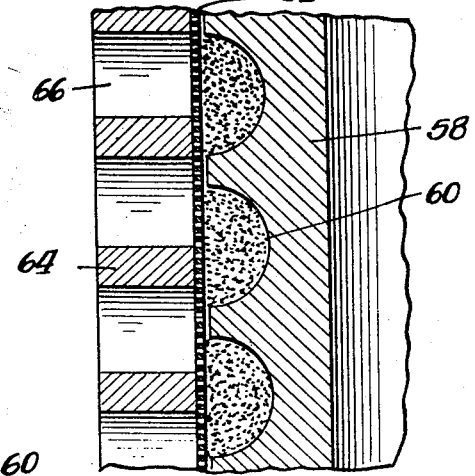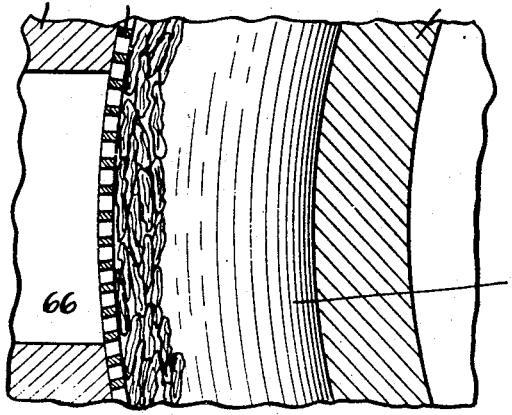

2,419,545

UNITED STATES PATENT OFFICE 2,419,545

METHOD OF AND APPARATUS FOR EXTRACTING JUICE

Herbert Edward Gray and Arvid Manuel Erickson, San Jose, Calif., assignors to Barron-Gray Packing Company, San Jose, Calif., a corporation of California Application June 19, 1940, Serial No. 341,346

10 Claims. (Cl. 99—105)

This invention relates to finely-divided and/or fluid vegetable and fruit products, and to an apparatus for and a method of producing such products. The invention is exemplified in connection with a machine for and method of producing a carrot product, particularly a palatable carrot juice.

Certain fruits and vegetables, for example, tomatoes, grapefruit, etc., are relatively easily converted into highly palatable and highly nutritious juices. Other fruits and vegetables, for example, carrots, do not lend themselves readily to conversion to juice by similar methods. Whereas, the first-named foods contain relatively little tough, absorbent, fibrous material, carrots, in common with various other raw foods, include such materials in large quantities.

The conventional method of extracting a juice is, of course, to convert the fruit or vegetable into a wet pulp and then separate the desired juice from the undesired fibrous material. It is in connection with this latter operation that difficulty is encountered in the case of carrots and other similar raw foods. The pulping is readily accomplished but the separation of a palatable juice from the fibrous material in this wet pulp is quite difficult because the fibrous material tends to absorb liquids and hold back desirable, finely-divided, non-fibrous solids.

Many of the valuable nutritious and beneficial constituents of carrots and other similar fruits and vegetables are found in the liquids which may be derived therefrom so that it is desirable to extract a maximum quantity of the liquid. There are, however, undissolved, non-fibrous, solid constituents of fruits and vegetables, such as carrots, which are desirable and, in fact essential constituents of a satisfactory juice since they include not only nutritious elements but perhaps more important elements which carry the characteristic odor, color, flavor, etc., of the carrot, for example. Thus, in extracting a juice from carrots and the like, the first consideration is a maximum of liquid, but with this a substantial and preferably a major portion of the finely-divided, undissolved, non-fibrous solids in the pulp must be extracted. The extraction of these solids must be accomplished without at the same time taking into the juice substantial quantities of undesirable fibrous material which tends to make the juice thick, viscous and unpalatable, and the presence of which in the juice tends to nullify one of the purposes of the juice, which is to present the valuable nutritious elements of the fruit or vegetable in a form in which they are free from undesired and worthless fiber.

In one of the methods used heretofore the resulting juice contains a reasonably large portion of the liquids of the carrot but contains too small a proportion of the solids, fibrous or otherwise, so that, while it is relatively fluid, it is deficient in sugar and other nutritious portions of the carrot, as well as in carotene content. The deficiency in nutritious constituents gives the product a low calorific value so that the juice is inferior in quality in addition to being produced in relatively low yield. It is, however, substantially free of fibrous constituents.

Other methods have been devised by which larger yields are obtained and by which the calorific value and carotene content are increased over those of the product described in the preceding paragraph. This is accomplished by permitting excessive amounts of fibrous material to pass into the juice in order to include more of the non-fibrous solids. A somewhat smaller proportion of the total liquid in the pulp is extracted by this method as compared with that described above. The decreased quantity of liquid and the greatly increased quantity of fibrous material in this product, however, makes it much more thick and viscous and decreases its palatability.

By still another method, the extraction is conducted so that both the liquids and the non-fibrous solids pass into the juice without carrying with them very much fibrous material. In this method, however, very large amounts of liquid and some valuable solids are carried off in the pulp which is discarded so that the yields are extremely low. Even though the juice does have a relatively high content of nutritious constituents resulting in a higher calorific value, as compared with the foregoing products, and in a higher carotene content, nevertheless, both the calorific value and the carotene content are well below the maximum obtainable and, because the calorific value and the carotene content must be expressed in units of the product, they are misleading in one sense because, though high, they do not represent the extraction of the maximum of valuable constituents from the carrots due to the very considerable quantities of these which are carried off in the pulp together with a large portion of the liquids. It will be apparent that, while this juice may be palatable and attractive, it is not a good commercial product since its good qualities are obtained only by wasting valuable portions of the carrot and since, in connection with this waste, the calorific value and carotene content are kept well below the maximum possible.

It is therefore an object of this invention to produce a juice in high yield from a fruit or vegetable containing large quantities of tough, absorbent, fibrous material, which juice contains substantially all the liquid constituents of the fruit or vegetable and a substantial and preferably major proportion of the undissolved, non-fibrous, solid constituents, but which is relatively free of the undesirable fibrous material of the fruit or vegetable.

Another object is to provide a method of and an apparatus for producing such a juice.

A more specific object is to provide a juice from carrots which is relatively free of the undesirable fibrous material of carrots and which contains substantially all of the liquid constituents of carrots and a major proportion of the undissolved, non-fibrous, solid constituents of the carrots, both the liquids and the non-fibrous solids being present in such juice in much higher percentages than those in which they are found in carrots.

Another object is to provide a juice from carrots which contains relatively small amounts of the undesirable fibrous materials of carrots and which contains substantially all of the liquid constituents of carrots, together with a major portion of the non-fibrous, solid constituents, but in which juice the proportion of non-fibrous, solid constituents relative to the liquids is substantially less than it is in the carrots.

Still another object of this invention is to provide a method of and apparatus for producing juices from such fruits and vegetables, particularly carrots, which method and apparatus are adapted to provide a maximum yield and a better control of the quality of the product so that a more standardized product, giving maximum yield and fluidity, is obtained, with a minimum of undesirable fibrous material in the product.

Another object is to provide a method and apparatus in which little or no juice coagulation takes place.

A still more specific object is to provide an improved carrot juice in high yield consisting substantially solely of the liquid and finely-divided, undissolved, non-fibrous, solid materials of carrots so that the product is relatively free of the fibrous material of carrots, and to provide a method of and an apparatus for producing this improved product, said product including substantially all of the liquid constituents of the carrot, together with from about fifty per cent to about ninety per cent of the non-fibrous solids.

Still another object is to provide an improved carrot juice in high yield, together with a method of and apparatus for producing the same, which carrot juice is substantially free of fibrous material and contains substantially all of the liquid constituents and a greater percentage of the valuable solid constituents, whereby the calorific value and carotene content of the juice is greater than that of juices heretofore known.

Still another object is to provide a method for increasing the yield of carrot juice, which also results in a juice of higher quality than those heretofore obtainable.

Still another object is to provide a canned, sterilized carrot juice free from coagulation and instability and containing the constituents of the carrots, other than the fibrous, in approximately the same relative proportions in which they are found in the carrots.

It has now been found that these objects may be accomplished by converting fruits and vegetables, containing large amounts of tough, absorbent, fibrous material, for example, carrots, into a wet pulp, then straining the pulp under such conditions that the pulp is continuously subjected to moderate agitation without extensive disintegration whereby liquid constituents, carrying with them finely divided, undissolved, non-fibrous solids but substantially no fibrous solids, are separated from the fibrous pulp, and thereafter subjecting the remaining pulp to a pressing and filtering step to squeeze out residual liquid. The residual liquid so extracted is then returned to the straining step, wherein it is recovered, together with the initial juice extract, either by adding it to the wet pulp passing to the straining step or by combining it with the juice extracted in the straining step.

The product resulting from this operation is a juice highly concentrated in the valuable constituents of the fruit or vegetable, for example, the carrot, but which is largely free of worthless fibrous material. It has been found that the pulp remaining after the pressing and filtering step is a relatively dry, fibrous mass containing little or none of the desirable liquid constituents and minor amounts of the non-fibrous solid constituents of the fruit or vegetable. On the other hand, the juice produced by this method may be readily standardized and, in the case of carrots, for example, has all the pristine color, odor, taste, appearance and vitamin characteristics of the carrot, including substantially all of the liquid, together with a major portion of the non-fibrous solid constituents and substantially no fibrous constituents.

The manner in which the improved juice is produced will become more apparent from a perusal of the following specification when taken in connection with the accompanying drawings, wherein:

Figure 1 is a somewhat diagrammatic view of an improved apparatus for carrying out the method herein described for producing the product claimed;

Figure 2 is a somewhat similar view of a slightly modified apparatus for carrying out the objects of this invention;

Figure 3 is a view, partially in section, showing the feed hopper and juice extractor and also the adjustable bearing therefor;

Figure 4 is a cross-sectional view of the juice extractor;

Figure 5 is a plan, sectional view taken on the line 5—5 of Figure 4;

Figure 6 is an enlarged, fragmentary, detail, sectional view of the juice extractor, showing the maximum adjustment;

Figure 7 is a view similar to Figure 6, showing the minimum adjustment;

Figure 8 is an enlarged, detail, cross-sectional view on the line 8—8 of Figure 6; and Figure 9 is a view similar to Figure 8, also taken on the line 8—8 of Figure 6 but showing a different stage of the juice extraction.

Certain fruits and vegetables, as pointed out above, include a large amount of tough, absorbent, fibrous material. The liquids and finely-divided, undissolved solids, which are included among the desirable constituents of a juice of such fruit or vegetable, are contained within a cellular structure formed of this fibrous material and are extracted or freed only with difficulty. This is particularly true of carrots, wherein the valuable liquids and finely-divided, undissolved solids, including the desired pigments, minerals, vitamins, etc., become so intimately associated with the fibrous structure of the carrot that in the ordinary processes of pretreatment, including the existing methods of extracting a juice from carrots and even in digestive operations in the human body, a large percentage of these valuable constituents is lost.

The present invention is concerned with a machine, a method, and a product; more specifically, the product is a carrot juice wherein is preserved all or substantially all of the liquid portions of the carrot, together with a major portion of the non-fibrous, solid portions of the carrot, but which is free or largely free of the worthless, tough, absorbent, fibrous material of the carrot. This juice is free flowing and palatable, exactly as it is extracted from the carrot, and does not require dilution with materials other than those derived from the carrot. Thus, this carrot juice is composed of substantially all the valuable liquid constituents of the carrot, together with from about fifty per cent to about ninety per cent of the non-fibrous, solid constituents, but, because the worthless, fibrous material has been largely eliminated, the desirable constituents are present in the juice in far greater percentages than they are in the carrot itself. The juice is beneficial because it includes substantially all of the desirable constituents of the carrots. It is also pleasing in appearance, taste and odor or bouquet. The method and machine are designed to produce the juice described in high yields so that fibrous pulp which is discarded contains only negligible quantities of the valuable liquids and minor proportions of the non-fibrous solids included in the carrot.

Thus the juice produced by the method disclosed herein has been found, upon analysis by the Peterson-Hughes method, to contain in the neighborhood of 30,000 International units of carotene per 100 grams, whereas juices produced by previously known methods have not been found to exceed about 25,000 International units of carotene per 100 grams, and in some cases have run as low as 16,000 units per 100 grams. The carotene content will vary somewhat, depending upon the carotene content of the carrots from which the juice is prepared but, due to the high efficiency of the method of this invention, carrot juice containing in excess of 26,000 International units of carotene per 100 grams is readily obtainable.

Briefly, the improved method involves preliminarily treating the carrots by grinding or otherwise to reduce them to a fine juicy pulp. This treatment is preferably carried out so that a maximum, or something approaching a maximum, of liquid is freed from the cellular structure in which it is imprisoned without, however, so breaking up the fibrous material that the latter passes out in substantial quantities in subsequent separation steps with the desired liquids and finely-divided, undissolved, non-fibrous solids.

This pulp is then processed in a first step in such a way that a major portion of the liquid, together with a large amount of the finely divided, non-fibrous solid material present is separated from the fibrous material of the carrot. This pulp during this separation step is subjected to moderate agitation, which is preferably adapted to permit a maximum of finely-divided, non-fibrous solids to be drawn off with the liquid without further breaking up the fibrous material to the point where appreciable amounts of it pass off with the separated liquids. Some grinding or shredding does usually take place in this step but it should not be so excessive as to break up the fibrous material to the point where substantial quantities of it pass out with the liquid constituents of the carrots. It is not necessary, however, that any grinding or shredding take place in this step if a sufficient amount of grinding or shredding has taken place in the preliminary treatment.

The pulp remaining after this first step is then pressed in a second step to extract as much as possible of the liquid absorbed or otherwise held in the pulp after the first step. During this pressing step substantially all of the residual liquids are extracted but, because the fibrous material becomes packed, the liquid obtained is more or less colorless and contains little or no solid material but, since a major proportion of the finely-divided, undissolved, non-fibrous solids have passed off in the first step, this is not objectionable. This liquid is added either to the juice flowing from the first step or to the wet pulp entering the first step. In the latter case it serves to assist in extracting the finely-divided, non-fibrous, undissolved solids which the fibrous material tends to hold back. The pulp which remains after these two steps is practically dry and consists almost entirely of worthless fibrous material, together with minor proportions of non-fibrous solids.

The method and apparatus, and the nature of the ultimate product produced, will be best understood from a complete description of the apparatus used.

In Figure 1 we have shown any type of grinding mechanism 2 into which carrots are fed, and which apparatus is adapted to grind the carrots into a fine and juicy pulp without, however, so breaking up the fibrous material that it tends to pass out in substantial quantities in the succeeding step with the finely-divided, non-fibrous solids. This pulp discharges from the grinder 2 through a valved outlet 4 into a hopper 6 which in turn discharges into the centrifugal mechanism shown more in detail in Figures 3 to 9, inclusive. In this mechanism the liquids and finely-divided, undissolved, non-fibrous solids are thrown out from the juicy pulp through a screen under centrifugal action, the juice, including these liquids and solids, being delivered from the juice extracting mechanism 8 by means of a pipe 10 to a container 12, whereas the fibrous pulp is delivered by means of a chute 14 into any type of press 16 operable to free the remaining liquids from the fibrous material, which liquids are delivered through a pipe 18 into the juice container 12. The practically dry pulp is delivered by means of a separate conduit 20 into a container 22.

The mechanism shown in Figure 2 of the drawings comprises a slight modification of that shown in Figure 1. In Figure 2 the extracted juice from the press 16 is delivered through a conduit 24 by means of a pump 26 back to either the grinder 2 through a valved line 122 or to the feed hopper 6 through a valved line 124, for the purpose of flushing the grinding mechanism and assisting in the juice extracting cylinder, in carrying off the finely-divided, undissolved, non-fibrous solids, and likewise to add the juice into the system or process at one of these points. Lines 122 and 124 are both shown in Figure 2 to illustrate alternative methods. If desired, of course, either may be omitted, in which case the other need not be valved.

By more particular reference to Figures 3 to 9, inclusive, it will be seen that the juice extracting mechanism for straining off the liquids and finely-divided, undissolved, non-fibrous solids comprises a suitable base member 30 which is provided with a central bearing housing 34, for bearings 43, through which the base member 30 is mounted upon an adjustable sleeve 36, which sleeve has a threaded engagement with a shaft 38. Shaft 38 extends down through a thrust bearing 40 in which it is supported by a shoulder 41 on shaft 38, as shown in Figure 3. The thrust bearing 40 is mounted on a supporting framework (not shown). The adjustable sleeve 36 supports on its upper end an inner raceway 42 for bearings 43. The outer raceway 44 for bearings 43 is supported in housing 34 and is held in position by a removable circular plate 46 which is fastened to the housing 34 by means of bolts 48. Suitable packing 49 is provided between the inwardly projecting, upper portion of housing 34 and the shaft 38.

A series of pulp discharge ports 50 through the conical wall of the base member 30 provides outlets for the fibrous pulp material from which most of the desirable solids and a major portion of the liquids have been extracted, but which still contains an appreciable amount of recoverable liquid. Surrounding the side and bottom of base member 30 and the upper portion of sleeve 36 is a stationary shield 32 against which the pulp from juice extracting mechanism 8 is thrown from ports 50. This pulp is then discharged through chute 14, a downward and lateral extension of shield 32. The bottom portion of shield 32 is provided with a central aperture 33, the edges 35 of which curl upwardly around sleeve 36 which passes therethrough to prevent the escape of the wet pulp. Shield 32 is held in position by suitable brackets 35 connected to the juice extracting mechanism 8.

On the upper end of the shaft 38 there is formed an enlarged portion 52 having a threaded section which provides means for shifting the threaded sleeve 36 in a vertical direction. Also formed on the enlarged portion 52 of the shaft 38 is a series of radial notches 54 (see Figure 5) which engage fins 56 projecting downwardly from the bottom portion of the inner tapered cylinder 58. The notches 54 in the enlarged portion 52 of the shaft 38 provide a seat or supporting means for the inner tapered cylinder 58.

By adjusting the threaded sleeve 36 relative to the threaded portion on the shaft 38, a lowering or raising of the inner tapered cylinder with relation to the outer cylinder is accomplished, as shown in Figures 6 and 7. Holes 39 are provided in sleeve 36 to receive a wrench or other device for turning sleeve 36 to effect such adjustment. A set screw 37 mounted in sleeve 36 serves, when tightened against shaft 38, to hold the sleeve and shaft in any position to which they are adjusted. This adjustment is for the purpose of varying the clearance between a feed screw 60 formed on the inner tapered cylinder 58 and the inner surface of a tapered cylindrical screen 62.

Clearance is provided at this point in order to avoid undesirable friction between cylinder 58 and screen 62 which, as is pointed out more clearly hereinafter, revolve at different rates. Friction between these members not only increases power consumption but likewise produces heat which tends to cause coagulation of the juice and consequent gumming up of the machine. If the clearance is too large, however, plastering results, i. e., the pulp becomes plastered on the screen and tends to prevent the liquids and fine solids from passing through. The preferred clearance where carrot juice is being extracted is that which is small enough to prevent appreciable plastering without being so small as to cause undesirable friction. Adjustment of sleeve 36 is made to approach this optimum as closely as possible.

Where, for example, the extractor is to be used only for processing one particular fruit or vegetable, such as carrots, it is not necessary to provide means for adjusting the clearance between cylinder 58 and screen 62, if the machine is constructed originally to provide the optimum clearance. Conversely, where the machine may be used to extract juice from a variety of fruits and vegetables, or with different thicknesses of screen, then the adjustable clearance arrangement is desirable. Also, in certain cases plastering is desirable, and the provision of means for adjusting the clearance make it possible to increase the clearance to the point where some plastering takes place.

The screen member 62 is preferably formed of a sheet of stainless steel and is stamped out co-extensive with its entire length to form apertures providing the equivalent of a fine mesh screen through which the liquids and fine, undissolved solids may pass so that these latter are strained and separated from the fibrous pulp material. The finely-perforated screen 62 preferably runs approximately .010 to .020 of an inch in size where carrots are being treated, but this may be varied considerably if desired, depending, for example, on the use to which the extractor is to be put. This screen is rigidly mounted on the inner face of a tapered cylinder 64.

This outer cylinder 64 is also preferably formed of stainless steel and is punched to provide perforations 66. The screen 62 is likewise formed of rust-proof material. The plurality of relatively larger openings 66 permits the fine, undissolved solids and the liquids which are strained through the screen to pass through this outer cylinder into a housing 28 having a spout 114, hereinafter described, through which spout the juice flows out of housing 28. The outer perforated cylinder 64, which is driven at high speed, constitutes a rigid, perforated backing member for the inner screen 62 which is rotated with the rotatable cylinder 64. The lower portion of the cylinder 64 is rigidly mounted in the upper part of base member 30. The upper end of the tapered cylinder 64 is mounted in a rotatable cap 68, formed with a plurality of V-shaped grooves 70 to receive the belts 72, which belts pass over a pulley 74 on a spindle 76 of the motor 78.

Mounted upon the rotatable cap 68 is a flanged sleeve 80 which has a laterally projecting hub 82. A centrally disposed shaft 84 has a shoulder 86 which is supported on the bottom 88 of the tapered spiral cylinder 58. A portion 90 of the shaft 84, having a reduced diameter, extends through a central opening at the bottom 88 of the inner cylinder 58 and centrally of the depending, radially disposed lugs 56 on the bottom portion 88 of the inner cylinder, and then into a central circular cavity 92 formed in the upper portion of the threaded enlargement 52 of the lower shaft 38. As hereinbefore stated, the threaded enlargement 52, in addition to being provided with a centrally disposed circular cavity in its upper portion, is likewise provided with a series of radially disposed slots 54 which receive the radial lugs 56 hereinbefore described.

The upper end of shaft 84 projects upwardly through a central opening in cap 68, thence through hub 82, thence through a bearing 89 mounted on a supporting framework (not shown). A collar 101 is secured on shaft 84 above bearing 89. The openings in cap 68 and hub 82 are made large enough so that shaft 84 is free to revolve therein independently of the cap and hub. The upper portion of cap 68 includes a bearing housing 91. Supported in this house is an outer raceway 95 for bearings 97. An inner raceway 99 for bearings 97 is driven onto shaft 84. Flange 80 on cap 68 covers the bearing mechanism and supports the outer raceway 95 in position. This flange 80 is secured to cap 68 by bolts 87. Suitable packing 85 is provided between shaft 84 and the inwardly projecting lower portion of housing 91. The portion of shaft 84 projecting above bearing 89 has keyed thereto a V-groove pulley 93, driven by belts 94, which are driven in turn by another pulley 96 on the upper end of the shaft of the motor 78. The pulleys 74 and 96, being of different diameters, are selected so as to drive the shaft 84 and the rotatable cap 68 carrying the outer cylinder 64 at different speeds.

This differential speed of drive may be adjustably determined either by changing the pulleys or, if desired, by inserting an ordinary change speed gearing of any desired type. In the present instance, due to the selection of the pulleys, the outside tapered cylinder 64 is preferably driven about 4000 revolutions per minute and the inside spirally grooved cylinder is preferably driven about 3600 revolutions per minute, both in the same direction, thereby producing a differential rotation of about 400 revolutions per minute, which in turn produces a feed by means of the spiral groove of about 60 pounds of material a minute. These rates of revolution are preferred where the machine is used to extract carrot juice, but both the absolute and differential speeds of rotation of both the inner and outer cylinders may be varied somewhat from these preferred speeds, whether the machine is being used to extract carrot juice or for the extraction of a juice from other similar fruits and vegetables. Some extraction can be obtained when the inner cylinder is rotated more rapidly than the outer cylinder, but in the preferred method of operation the outer cylinder has the higher speed.

The differential speed of rotation of the inner and outer cylinders not only serves in cooperation with the spiral groove to feed the material through the extracting mechanism, but at the same time keeps the material undergoing extraction in a state of agitation so that new surfaces are constantly being presented to the screen. This agitation, being mild enough to avoid extensive grinding and shredding, thus serves to promote the extraction of the desired fine, undissolved solids.

The upper end of the shaft 84 is provided with a hollow bore 98 which communicates with the hopper 6 at its open top, and at its lower end communicates with the radially disposed conduits 102 and 104 formed in the inner tapered cylinder 58. The conduits 102 and 104 communicate with the spiral feed groove 60 hereinbefore described. The lower portion of the hopper has a tube 106 which extends down to and is aligned with the upper open top of the shaft 84. A packed cap 108 is provided on the upper end of shaft 84 and has a central opening to receive the lower end of tube 106 and provide a connection whereby the stationary hopper 6 may feed its finely ground, juicy pulp into the rotating tubular shaft 84. The top of the hopper 6 is provided with a cover 110 in turn having a tubular inlet opening 112 which, as hereinbefore described, connects with the discharge mechanism of the grinder 2.

Around the outside of the outer cylinder 64 and extending from the cap 68 to the base member 30 is the stationary cylindrical housing 28. Housing 28 is mounted by brackets 116 upon suitable supporting framework (not shown) and, by means of brackets 35 mentioned above in turn supports shield 32. The upper end of housing 28 is open but at its lower end it is provided with an inwardly and upwardly extending flange portion 118 forming a trough in which juice passing out through openings 66 is collected and conducted to spout 114 which in turn connects with pipe 10, shown in Figures 1 and 2, that discharges into the juice container 12. The flange portion 118 extends in close to and around base member 30 so that its innermost edge is positioned beneath lip 120 formed on the upper portion of base member 30. This arrangement prevents extracted juice from escaping between housing 28 and base member 30.

In the preferred operation of the present device, the carrots, for example, are fed into the grinder 2 where they are ground to any desired fineness, preferably not to such a fineness, however, as will permit substantial amounts of fibrous material to pass out in the extracting mechanism 8 with the desired liquids. The fine, juicy pulp so produced passes through pipe 112 into the feed hopper 6, thence in a continuous stream downwardly through the rotating tubular shaft 84 into the feed conduits 102 and 104, and thence into the spiral feed channel 60 of the rotating inner cylinder 58. This cylinder, which is preferably rotating at a speed of 3600 revolutions per minute, will throw the fine, juicy pulp outwardly against the rotating mesh screen 62, centrifuging and straining out of the pulp the desired liquids and finely-divided, undissolved, non-fibrous solids. Inasmuch as screen 62 is being rotated at the preferred rate of 4000 revolutions per minute in the same direction, a differential speed of 400 revolutions per minute exists between the feed channel 60 of the inner member 58 and the screen 62. This, of course, produces a much lower differential in speed than would exist were the outer screen stationary, but it is sufficient to produce a continuous downward feeding effect of the juicy pulp through the instrumentality of the spiral groove 60. The pulp thus moves down in the spiral groove 60 and at the same time is being centrifuged outwardly with a relatively large outward force, due to the high speed of rotation of the member 58. The presence of the outer cylinder 64 adjacent the inner cylinder 58 tends, if anything, to increase the centrifuging effect since it is rotating at an even higher speed in the same direction as the inner cylinder. Also, as pointed out above, the higher speed of the outer cylinder tends, not only to feed the material downwardly in the spiral groove, but at the same time keeps it in a moderate state of agitation which constantly presents new surfaces to the screen 62 and thus promotes the straining.

The centrifuging effect, of course, creates a high outward pressure of the juicy pulp against the inner wall of the screen 62, thereby causing the liquids and the fine, undissolved, non-fibrous solids which can do so to pass through the meshes or apertures of the finely-apertured screen 62, as shown in Figure 8. Figure 8 is a cross-sectional view of the material in the spiral groove before the extraction has progressed very far. In this figure, the liquids and fine, undissolved solids are passing through screen 62, but the relatively larger fibrous pieces, being larger than the interstices of the screen 62, cannot pass through, being retained on the inside of the screen where they are fed down by the combined effect of the differential speed and the spiral groove 60, being discharged out of the bottom apertures 50 into the hopper 6, the liquids and the finely-divided, undissolved solids passing out through the openings 66 into housing 28, and from thence through spout 114 into the container 12.

The adjusting mechanism provided on the shaft 38 for adjusting the clearance between the outer face of the inner tapered cylinder 58 and the inner face of the screen 62 may be arranged to provide a variation in clearance, for example, from about one-thirty-second ($\frac{1}{32}$) to about one-sixty-fourth ($\frac{1}{64}$) of an inch. The construction may provide for a different range of clearances, including either greater or lesser clearances, or both, if desired, or may be dispensed with entirely. The foregoing has been found entirely satisfactory where the machine is to be used in connection with the preparation of carrot juice. Preferably, for the extraction of carrot juice the clearance is made about one sixty-fourth ($\frac{1}{64}$) of an inch if no adjustment is provided, or if adjustment is provided it is adjusted to this size.

Many of the advantages of the device described herein will be apparent from the above description. Particular mention has already been made of the advantages accruing from rotating both the inner cylinder and the outer straining screen. It has also been pointed out that, because of the differential speed of rotation of these two while they are rotating in the same direction, the material undergoing extraction is forced downward through the instrumentality of the spiral groove. It has also been shown that the differential speed tends to produce a desired amount of agitation, particularly as contrasted with the effect of rotating the inner cylinder while the outer screen is stationary.

Additional advantages accruing from the rotation of the outer screen are that excessive friction of the material against the inner wall of the screen 62 is avoided, as a consequence of which the machine not only requires less power for operation, but does not tend to heat up and cause undesirable coagulation of the juice. By making the outer screen rotate at a different rate than the inner cylinder, the advantage of agitation, due to rotation of the inner cylinder with respect to the screen, is retained, however.

In a device where the inner cylinder only rotates, since it must be rotated at a relatively high speed in order to produce sufficient centrifuging effect, the friction of the material passing over the screen is quite high. Thus, not only excessive heat but excessive grinding of the food against the screen takes place so that the fibrous portions become so reduced in size that they pass through the screen, producing an undesirably large quantity of fibrous material in the juice. By reason of the greatly reduced friction due to the rotation of both the screen and the inner cylinder, it has been found that the present machine is operable with a from two to ten horse power motor, whereas, if the outer screen were stationary, a much higher powered motor would be required for a machine capable of processing material at an equivalent rate.

Further advantages of the device disclosed herein also reside in the provision of the relatively shallow, spiral grooves cooperating with the differential rate of rotation of the inner and outer rotating cylinders. It has been indicated above that, by adjusting the clearance between the two cylinders, plastering or stratification of the pulp against the screen may be avoided, and the screen surface may be kept clean. This results from the fact that the edges of the spiral feed channels are constantly wiping laterally across the entire extent of the screen and, when the clearance is made small enough, this wiping is sufficient to keep the screen relatively clean. Moreover, since the spiral feed channel is relatively shallow, a standardized uniform and thin cross-sectional amount of finely-ground pulp is presented to the rotating screen. This body of pulp, however, due to the differential speed of rotation and the arrangement of the spiral feed channel, is constantly moved downwardly relative to the surface of the screen, and also laterally. As a result of all this, the pulp being centrifuged and strained is not only continuously agitated but is kept below a certain cross-sectional thickness, which provides a very desirable maximum of surface presented to the screen at all times. It is clear that such a thin layer enables the centrifugal force applied to produce a maximum straining out or separation of the portions of the pulp which are small enough to pass through the screen, and tends to reduce to a minimum any tendency on the part of the fibrous portions of the pulp to themselves act as a filter and hold back the desired finely-divided, undissolved, non-fibrous solids. Furthermore, due to the arrangement of the device, an initially thin layer of pulp is not covered up by a further layer, producing the undesired plastering which is an important defect of machines not arranged to avoid it.

The fibrous pulp, from which a large portion of the liquids and finely-divided, undissolved, non-fibrous solids have been extracted in mechanism 8, passes out of the bottom of the cylinder and is discharged into the press 16. Press 16 may be of any desired construction which operates to extract liquid from the wet pulp by pressing or squeezing it. The operation is thus a combined pressing and filtering or straining operation. In this step the effort is directed toward the extraction of the maximum quantity of residual liquids without any fibrous solids. Some very finely-divided, undissolved, non-fibrous solids may pass through the filter with the liquids but the step is not depended upon to materially increase the solids content of the juice. Thus, the press 16 may be a filter press or other like device in which the liquid is pressed out and simultaneously filtered from any solid materials, the pressing resulting from direct mechanical application of pressure or from centrifuging or other methods.

In point of fact, when the pulp is properly confined by a suitable filtering material, it itself exerts a filtering action, the larger pieces of fiber tending to pack together to form an additional filter. The liquid extracted from this press is more or less colorless, being practically water white, although it does contain small amounts of solids, and is not as great in volume as the juice coming from the centrifugal extractor. The lack of color in the press liquid is due to the fact that it contains only very small amounts of finely-divided, undissolved, non-fibrous solids, the major portion of the solids having been removed in the centrifugal extractor.

Although, as pointed out above, the presence of a substantial quantity of finely-divided, undissolved, non-fibrous solids in the juice is important, it is even more important to have a maximum quantity of liquids therein. The pressing step contributes to this by removing from the fibrous pulp coming from the centrifugal extractor substantially all of the liquid, which liquid is then returned to the centrifugal extraction step, wherein it is eventually combined with the juice extracted in the first step, for example, by returning it through pipe 18 to the juice container 12. By means of this additional extraction, a much higher fluidity is obtained in the final product, which fluidity may be standardized. The ultimate product then contains, not only a major portion of the finely-divided, undissolved, non-fibrous solids that were in the original material, for example, carrots, but also substantially all of the juice that was in the carrots, so that the maximum portion of the desired constituents of the original material is found in the juice which does not, however, contain appreciable amounts of the undesired, worthless fibrous material.

It will be seen that this process has the advantage that a maximum amount of finely-divided, undissolved, non-fibrous solids are first extracted before subjecting the pulp to the pressing operation, which is essential to extract a maximum of juice due to the absorbent nature of the fiber since, in the pressing operation, the fibrous material tends to pack and hold back the fine solids.

It has been found that a preferred method of operation involves operating the two steps in combination so that the ratio of the quantity of juice extracted in the first step to that extracted in the second is about two to one when the liquid from the second step is added directly to the juice in the juice container 12, as shown in Figure 1 hereof. Obviously, this ratio can be altered by varying the conditions under which the extraction step is carried out. In the case of carrots, however, it has been found that highly satisfactory results are obtained when the mechanism is arranged to produce juice and liquid in the ratio indicated above.

In the process shown in Figure 2 of the drawings, instead of discharging the rather colorless liquid coming from the press 16 directly into the juice container 12, it is pumped back to the extraction step, wherein it is added with the raw material to the grinder mechanism or, alternatively, directly into the feed hopper. The result of this recycling of liquid from the pressing step is to mix the colorless liquid with the fine, juicy pulp whereby it is given a greater fluidity and whereby the added liquid serves to wash out more of the desired finely-divided, undissolved, non-fibrous solids in the centrifugal extraction step and to increase the rate at which the pulp material passes through the centrifugal extracting mechanism.

It will thus be seen that a greatly improved method of extracting the juice of fruits and vegetables containing large quantities of tough, absorbent, fibrous material, such as carrots and the like, has been provided. Likewise, an improved apparatus for carrying out this method of extraction has been created. Furthermore, the final juice resulting from this new and improved method of extraction differs substantially from juices which may be prepared by methods heretofore known. The resulting product, as contrasted with those known heretofore, includes not only substantially all of the liquid in the raw material but, in addition, includes a major portion of the finely-divided, undissolved, non-fibrous solids without containing substantial quantities of the undesired fibrous material. The process lends itself readily to the production of a standardized yield of a juice of desired fluidity and provides for better control of the quality of the product.

The method of carrying out the centrifuging step adds materially to the uniform nature of the product in that the thin layer of juicy pulp on the extraction screen, together with its continued agitation due to the differential rotation rate between the screen and the inner cylinder, both act to subject all portions of the pulp to substantially the same conditions as they pass through the extracting mechanism. The centrifugal extracting mechanism does not have any places where pulp undergoing extraction may pack or pile up and thus interfere with the extraction of pulp passing through the mechanism thereafter.

It will be apparent, of course, that by separating the fibrous material from the other constituents of the carrot, for example, a carrot concentrate is in fact produced which includes both the liquids and the desired non-fibrous solids in a much greater percentage than that in which they are present in the carrot itself.

Still another important feature of the present invention resides in the fact that, by utilizing a positive feeding mechanism for continuously conveying precise and predetermined volumes of the fine, juicy pulp across the entire surface of the rotating screen, a much better result is obtained than if the feeding were left to the action of gravity. This positive feed, in addition to providing moderate agitation and thin layers on the filtering screen, has the added advantage of passing the material positively through the mechanism at a relatively uniform rate.

A further important advantage of the apparatus disclosed herein is found in the arrangement whereby both the outer straining screen and the inner cylinder rotate. By having both of these members rotate, it is possible to rotate the inner cylinder at a speed which will produce an adequate centrifuging effect without having at the same time undesired or excessive friction between the material being centrifuged and the outer straining screen. This feature also permits the provision of a smaller clearance between the inner cylinder and the screen without excessive friction, whereby less grating and grinding of the fibrous material takes place. By rotating the outer screen at an even higher rate than that at which the inner cylinder is rotated, the pulp passing through the extracting mechanism tends to slide rather on the smooth surface of the spiral groove than upon the surface of the screen, which further reduces friction, as well as grinding and grating.

The present process not only produces a better product than processes known heretofore but, in addition, produces this product in greater quantity, particularly relative to the amount of fibrous material in the carrot. It is estimated that the present process and apparatus will produce, for example, approximately twenty per cent more juice from carrots than processes known heretofore.

A decided advantage of the device disclosed herein over previously known devices in which a pulp, such as carrot pulp, is centrifuged by an inner rotating body against an outer straining screen, is that the product of the device disclosed herein is always consistent in fluidity, whereas previously known devices for this purpose require frequent adjustment in order to keep the fluidity relatively constant.

In the preparation of canned carrot juice it is important that mature and fully developed carrots be used. By mature and fully developed carrots we means carrots that have been harvested approximately five or more months after planting instead of being harvested sixty or ninety days thereafter, such as is the practice in harvesting carrots for fresh market shipments. We have found that in the preparation of a satisfactory commercial canned carrot juice mature carrots provide essential qualities to insure success in the homogenizing and sterilizing step and insure freedom from coagulation and instability in the finished product. The process for commercially producing such a successful canned carrot juice comprises processing the fully developed and mature carrots in the manner hereinbefore described to obtain the carrot juice therefrom and after which such carrot juice is heated to approximately 212 degrees Fahrenheit, at which point coagulation occurs. The coagulated body of juice is then homogenized to restabilize it. Homogenization may be carried out in any well known apparatus adapted to the purpose whereby the finely divided solids are redispersed in the liquid. This coagulation and homogenization permit the final product to pass through the canning operation without further coagulation. According to the preferred method of operation, the coagulated and homogenized product is then pressure cooked to sterilize it at the time that it is canned.

It is apparent that many widely different embodiments of this invention may be made without departing from the spirit and scope thereof, and therefore it is not intended to be limited except as indicated in the appended claims.

The invention is hereby claimed as follows:

1. A rotatable cylinder adapted to be employed in a centrifugal juice extractor comprising said cylinder and an encircling, rotatable, straining screen spaced slightly from said cylinder, said cylinder comprising a circumferentially continuous, annular portion provided on its outer surface with a continuous spiral groove of relatively small cross-sectional area extending substantially from the top to the bottom thereof and communicating at one end with a source of juicy pulp, the said groove being of such pitch that adjacent portions thereof are separated by a distance equal to a small fraction of the width of the groove, and said cylinder being of such length that it is encircled by said groove in excess of ten times.

2. A rotatable cylinder adapted to be employed in a centrifugal juice extractor comprising said cylinder and an encircling, rotatable, straining screen, said cylinder comprising a circumferentially continuous, annular portion provided on its outer surface with a continuous spiral groove of relatively small, hemispherical, cross-sectional area extending substantially coextensive with the length of said cylinder and communicating at one end with a source of juicy pulp, the said groove being of such width and pitch that adjacent portions thereof are separated by a distance equal to a small fraction of the width of the groove, said cylinder being of such length that it is encircled by said groove in excess of ten times, and means for imparting relatively high speed rotation to said cylinder and also to said screen to impart centrifugal action to the juicy pulp.

3. In a device of the class described, the combination of a rotatable cylinder and a rotatable straining screen encircling said cylinder, said cylinder comprising a circumferentially continuous, annular portion provided on its outer surface with a continuous spiral groove of relatively small cross-sectional area extending from the top to the bottom thereof and communicating at one end with a centrally disposed source of juicy pulp, said screen and said cylinder being arranged to rotate in the same direction at centrifuging speeds of different magnitude, the speed of the screen being somewhat greater than that of the cylinder and the clearance between the two being less than about one-sixteenth of an inch and great enough to avoid excessive friction.

4. In a device of the class described, the combination of means forming a source of relatively fine, juicy pulp containing liquid, finely divided, undissolved, non-fibrous solids and relatively larger fibrous solids, a rotatable cylinder comprising a circumferentially continuous, annular portion provided on its outer surface with a continuous spiral groove of relatively small cross-sectional area extending from the top to the bottom thereof and communicating at one end with said source of juicy pulp, means for continuously feeding the pulp to said groove, a cylindrical straining screen encircling said cylinder and having therein openings of a size such that they will permit liquids and finely divided, undissolved, non-fibrous solids to pass therethrough but will not pass any appreciable quantity of fibrous solids, and means for rotating both said cylinder and said screen at centrifuging speeds of different magnitude, the speed of the screen being greater whereby the pulp in said groove is simultaneously centrifuged and advanced in said groove away from the end at which it is fed into said groove.

5. In a device of the class described, the combination of a centrifuging device and a filter press arranged to receive the residue from said centrifuging device, said centrifuging device comprising a rotatable cylinder having a circumferentially continuous, annular portion provided on its outer surface with a continuous spiral groove of relatively small cross-sectional area extending from the top to the bottom thereof and communicating at one end with a source of juicy pulp, a cylindrical straining screen encircling said cylinder and having therein relatively small openings, and means for rotating both said cylinder and said screen at centrifuging speeds of different magnitude whereby the pulp in said groove is simultaneously centrifuged and advanced in said groove away from the end at which it is fed into said groove and toward the said filter press.

6. A process for preparing a liquid composition from a raw food of vegetable origin containing large amounts of tough, absorbent, fibrous material, which comprises grinding the vegetable to a fine, juicy pulp containing liquids and finely divided, undissolved, non-fibrous solids and fibrous solids which are relatively larger than said undissolved solids, centrifuging said pulp in a relatively shallow layer and without shredding the relatively larger fibrous solids while gently agitating said centrifuged pulp and under conditions such that the pulp is centrifuged against a rotatable straining screen moving at a centrifuging speed higher than that of the pulp, which screen is adapted to pass liquids and finely divided, undissolved, non-fibrous solids from the food without passing appreciable quantities of fibrous solids, then subjecting the pulp from said centrifuging step to a filtering step under pressure whereby the residual liquids in said pulp are separated, and recovering said residual liquids with the liquids and solids separated in said centrifuging step.

7. In a process of extracting a juice from carrots, the step which comprises continuously feeding a relatively thin layer of carrots in the form of a fine, juicy pulp across a rotating member having relatively fine openings therein while causing centrifugal force to press said pulp against said perforated member and agitate said pulp to permit finely divided, undissolved, non-fibrous solids to pass through said perforated member without breaking up the fibrous solids to the point where substantial quantities thereof pass through said perforated member with said non-fibrous solids.

8. In a process for recovering a juice from carrots, the step which comprises passing a body of carrots in the form of a fine, juicy pulp of relatively small cross-sectional area across a screen, adapted to pass liquids and finely divided, undissolved, non-fibrous solids without passing any appreciable quantities of fibrous solids, while rotating said screen at high speed, and centrifuging said moving layer of pulp against said screen.

9. In a device of the class described, the combination of a tapered, rotatable cylinder and a correspondingly tapered, rotatable straining screen encircling said cylinder and having therein openings of a size such that they will permit liquids and finely divided, undissolved, non-fibrous solids to pass therethrough but will not pass any appreciable quantity of fibrous solids, said cylinder comprising a circumferentially continuous annular portion provided on its outer surface with a continuous, spiral groove of relatively small cross-sectional area extending from the top to the bottom thereof and having at one end thereof means for supplying juicy pulp to said groove adjacent one end thereof, the diameters of said screen and said cylinder decreasing from the end of said cylinder at which said pulp is fed to the other end of said cylinder at which a solid residue is discharged, said screen and said cylinder being arranged to rotate in the same direction at centrifuging speeds of different magnitude, the speed of the screen being somewhat greater than that of the cylinder, and the clearance between the two being of such size as to avoid both plastering and excessive friction.

10. In a device of the class described, the combination of a tapered, rotatable cylinder and a correspondingly tapered, rotatable straining screen encircling said cylinder and having therein openings of a size such that they will permit liquids and finely divided, undissolved, non-fibrous solids to pass therethrough but will not pass any appreciable quantity of fibrous solids, said cylinder comprising a circumferentially continuous and relatively long annular portion provided on its outer surface with a continuous, spiral groove of relatively small, hemispherical, cross-sectional area extending from the top to the bottom thereof and having at one end thereof means for supplying juicy pulp to said groove adjacent one end thereof, the said groove being of such width and pitch that adjacent portions thereof are separated by a distance equal to a small fraction of the width of the groove, the diameters of said screen and said cylinder decreasing from the end of said cylinder at which said pulp is fed to the other end of said cylinder at which a solid residue is discharged, said screen and said cylinder being arranged to rotate in the same direction at centrifuging speeds of different magnitude, the speed of the screen being somewhat greater than that of the cylinder, and the clearance between the two being of such size as to avoid both plastering and excessive friction.

HERBERT EDWARD GRAY.
ARVID MANUEL ERICKSON.

REFERENCES CITED

The following references are of record in the file of this patent:

UNITED STATES PATENTS

| Number | Name | Date |
|---|---|---|
| 1,832,269 | Webb | Nov. 17, 1931 |
| 2,089,071 | Roberts | Aug. 3, 1937 |
| 488,956 | Sobotka et al. | Dec. 27, 1892 |
| 1,956,719 | Johnson | Mar. 1, 1934 |
| 2,055,263 | Robinson et al. | Sept. 22, 1936 |
| 2,223,739 | Newton | Dec. 3, 1940 |
| 2,223,772 | Waller | Dec. 3, 1940 |
| 1,903,795 | Rigler | Apr. 18, 1933 |
| 1,170,554 | Morath | Feb. 8, 1916 |
| 1,001,661 | Macklind | Aug. 29, 1911 |
| 2,148,826 | Millard | Feb. 28, 1939 |
| 2,266,911 | Schwarz | Dec. 23, 1941 |
| 2,089,071 | Roberts | Aug. 3, 1937 |
| 2,318,178 | McKinnis | May 4, 1943 |